United States Patent [19]

Hirose et al.

[11] Patent Number: 5,725,042
[45] Date of Patent: Mar. 10, 1998

[54] METHOD FOR PRODUCING HYDROGEN-ABSORBING ALLOY

[75] Inventors: Yoichi Hirose; Shiro Sasaki; Hiroshi Hasegawa; Uremu Hosono; Masahide Utsunomiya, all of Saitama, Japan

[73] Assignee: Showa Denko K.K., Tokyo, Japan

[21] Appl. No.: 773,709

[22] Filed: Dec. 24, 1996

[30]   Foreign Application Priority Data

Dec. 26, 1995 [JP] Japan .................................. 7-351596

[51] Int. Cl.⁶ .................................................... B22D 13/12
[52] U.S. Cl. .......................... 164/114; 164/117; 164/136; 420/900
[58] Field of Search ........................... 164/46, 114, 136, 164/118, 133, 76.1, 117; 148/539; 420/900

[56]   References Cited

U.S. PATENT DOCUMENTS 4,396,576   8/1983   Osumi et al. ........................ 420/455
5,008,164   4/1991   Furukawa et al. ..................... 429/59

OTHER PUBLICATIONS

Handbook on Physics and Chemistry of Rare Earths, "Rare Earth Intermetallics for Metal–Hydrogen Batteries", vol. 21, by T. Sakai et al., pp. 134–172.

*Primary Examiner*—Kuang Y. Lin
*Attorney, Agent, or Firm*—Armstrong, Westerman, Hattori, McLeland & Naughton

[57]   ABSTRACT

The segregation in the hydrogen-absorbing alloy is decreased by a centrifugal casting which is devised in the present invention so that: a melt fed to the bottom portion of a cylindrical rotary mold solidifies during one rotation of the mold; and, the average depositing speed of melt is from approximately 0.005 to 0.1 cm/second.

14 Claims, 1 Drawing Sheet

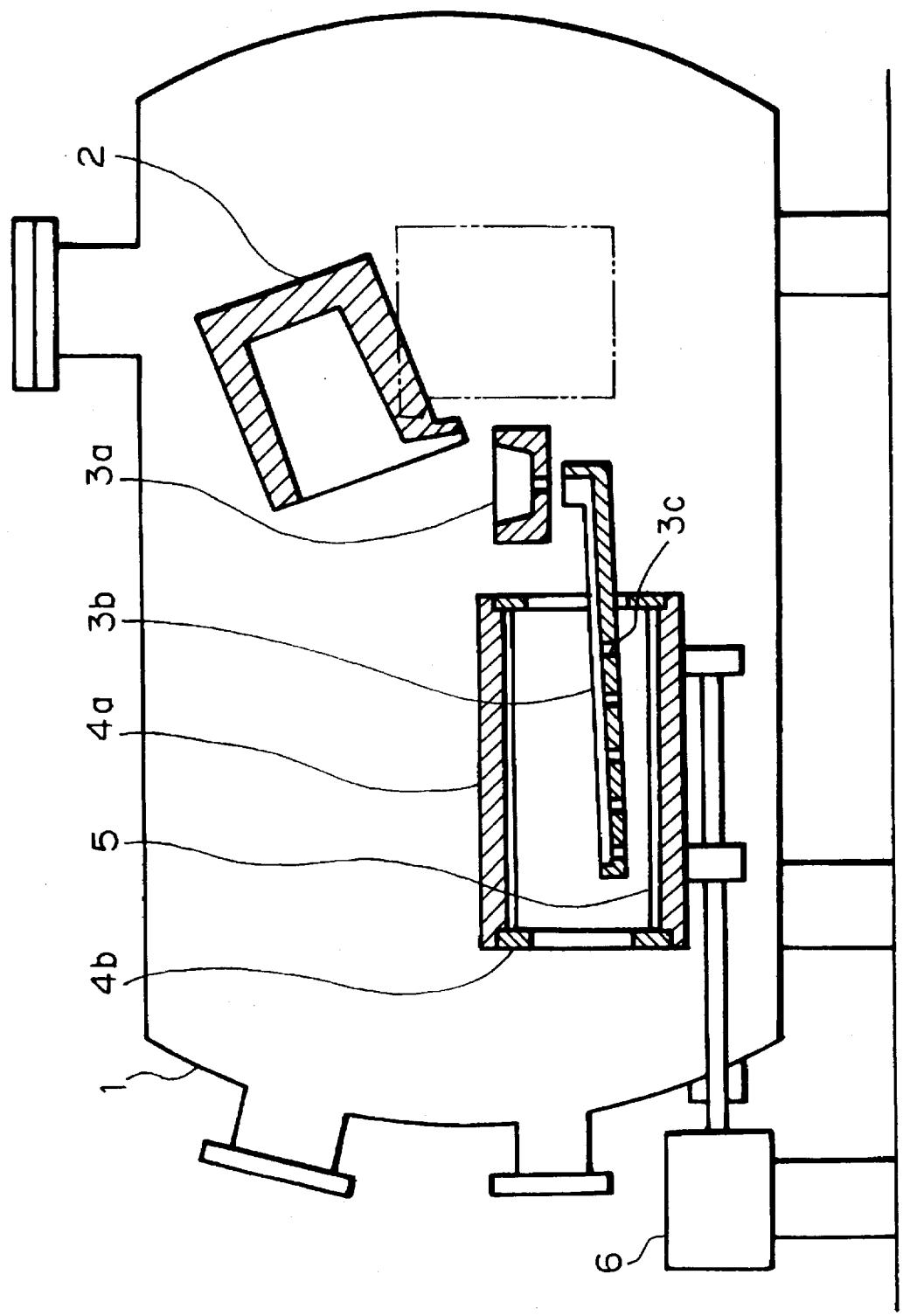

METHOD FOR PRODUCING HYDROGEN-ABSORBING ALLOY

BACKGROUND OF INVENTION

Field of Invention

The present invention relates to a method for producing a hydrogen-absorbing alloy, which is used for, for example, the cathode alloy of a nickel hydrogen secondary battery.

In recent years electronic devices have become miniaturized and their performance has been enhanced. For example, portable electronic devices with high performance are available now. Along with such tendency, a small-sized battery, which is the power source of the electronic devices, is furthermore required to enhance capacity and to prolong the life of the devices. The nickel hydrogen battery can exhibit higher capacity than the conventional nickel cadmium battery. Since the former battery is free of such harmful element as the cadmium contained in the latter battery. The effect upon the environment by the used batteries is less serious in the former type than in the latter. In addition, the nickel hydrogen battery is also advantageous in the point that it is replaceable with the nickel cadmium battery in view of the comparable battery voltage. Since the nickel hydrogen batteries have the advantages as described above, their practical use has rapidly become widespread.

The capacity and cyclic life of the nickel hydrogen battery are influenced by the properties of the hydrogen-absorbing alloy used as the cathode of the battery. Therefore, efforts to enhance the properties of the hydrogen-absorbing alloy have attracted much attention. Considerable success in this respect has been attained up to now.

The properties required for the hydrogen-absorbing alloy used as the battery are: its absorption amount of hydrogen is large; it is highly stable in the alkaline electrolyte; it is highly reversible; hydrogen mobility speed in the alloy is high; and, its hydrogen equilibrium pressure is appropriate. Among the hydrogen-absorbing alloys now in practical use, only the $AB_5$ type exhibits at present the well-balanced properties mentioned above. In the $AB_5$ type, "A" is one or more rare-earth element(s), such as misch metal, and, further "B" is one or more transition elements, such as Ni or the like. In practical application of the $AB_5$ type alloy, extensive research has been made to improve the properties by means of adding an additive element. The composition, which has been recognized in most studies to exhibit the most improved properties, is "A", which is misch metal, and "B", the main component of which is Ni partly replaced with Mn, Al and/or Co.

Heretofore, the alloy, which contains one or more rare-earth element(s) and is used as the cathode of a nickel hydrogen secondary battery, has been produced by means of melting the starting materials in a vacuum induction furnace or within an inert gas atmosphere and then casting the melt in a metal mold. It is difficult to cast a large amount of melt into a thin ingot in a melting plant, when the melting plant is expanded to mass production scale as importance must be given to economical operation. The thickness of the ingot must, therefore, be 20 mm or more in general. The solidification speed is, accordingly, low in the ingot. The solidification-start time considerably differs in an ingot along the direction across the major surfaces and also between the vicinity of the meltpoured portion and another portion apart from the melt-poured portion. The component elements of the alloy, therefore, disadvantageously segregate in macro- and micro- scales.

Since the segregation in the alloy components impairs the representative properties required for the nickel hydrogen secondary battery, such as the energy density and the cyclic life under repeated charging and discharging, it is proposed to subject the ingot after casting to annealing at high temperature. The annealing must be carried out in vacuum or in a special gas atmosphere with inert gas, because an active metal such as a rare earth element is contained in a large amount in the alloy. The production cost of the alloy is increased due to such special annealing.

In order to solve the above mentioned problem, that is, the difficulty in producing a thin ingot, it is proposed to employ for the production of hydrogen-absorbing alloy the strip casting method, such as a single roll method or a double roll method, so as to increase the cooling speed and hence to refine the structure of the alloy. However, in the strip casting method the melt containing a rare earth element, which is active, is held in a crucible, a holding furnace or a tundish for a long period of time and is then fed onto a roll or rolls in small amounts over a prolonged time. The components of the alloy melt are, therefore, liable to vary due to reaction of the alloy melt with the crucible or the like. In addition, since it is extremely difficult to maintain the temperature of the cast molten metal at a constant level, it is not expected that stationary and stable casting conditions can be maintained. The yield of the ingot is, therefore, disadvantageously lessened. Furthermore, plant equipment of strip casting is specialized and expensive.

Another proposed method is the atomizing method, in which the hydrogen-absorbing alloy containing one or more rare earth elements is pulverized by atomizing. For the atomizing, a thin melt stream is first formed and is then subjected to impinging of high-speed gas. Since the rare earth element is extremely reactive with refractory material, a nozzle made of refractory material for forming the thin melt stream is not appropriate.

In addition, a so-called spray-forming method is proposed for producing a hydrogen-absorbing alloy. That is, the atomized powder is deposited on a substrate so as to form an ingot while the powder is in a half-solidified state. This method also involves difficulty with regard to a refractory nozzle for forming a thin stream, and also necessitates a specialized, expensive plant equipment. In addition, the proportion of so-called powder overspraying, that is, when the powder is not deposited on a substrate but scattered outside the substrate, is high. Thus the production yield is disadvantageously low.

SUMMARY OF THE INVENTION

It is, therefore, an object of the present invention to provide a method for producing a hydrogen-absorbing alloy, in which the above described problems are eliminated.

It is another object of the present invention to eliminate the above mentioned problems involved in the production of a hydrogen-absorbing alloy which contains one or more rare earth element(s).

It is a further object of the present invention to decrease the segregation of an $AB_5$ type-alloy ingot, thereby enabling enhancement of the battery performance of a nickel hydrogen secondary battery.

It is a particular object of the present invention to provide a productive method for producing a hydrogen-absorbing alloy, in which the alloy structure is refined and the segregation is lessened by means of increasing the cooling speed, with the result that a battery, in which the so produced alloy is used as a cathode, can withstand the repeated charging and discharging for a number of cycles.

The present invention is improved over the conventional casting method in respect of refinement of the crystal grains and lessening the segregation in the hydrogen-absorbing alloy containing a rare earth element.

The present invention is characterized in that the alloy melt of a hydrogen-absorbing alloy is subjected to centrifugal casting at an average melt-depositing speed on the mold surface not exceeding 0.1 cm/second.

A method for producing a hydrogen-absorbing alloy according to an embodiment of the present invention comprises the steps of:

preparing a rotary body having a cylindrical mold surface;
rotating the rotary body around its longitudinal axis;
preparing a melt of the hydrogen-absorbing alloy;
pouring the melt of hydrogen-absorbing alloy onto the mold surface of the rotary body at an average depositing speed not exceeding 0.1 cm/second during the rotation of the rotary body; and,
centrifugally casting the melt of the hydrogen-absorbing alloy on the cylindrical mold surface, thereby rapidly cooling the melt of hydrogen-absorbing alloy.

There is also provided a method for producing a hydrogen-absorbing alloy, comprising the steps:

providing a rotary body having a cylindrical mold surface;
rotating the rotary body around its longitudinal
preparing melt of the hydrogen-absorbing alloy;
feeding the melt of the hydrogen-absorbing alloy on the mold surface to a predetermined bottom portion;
centrifugally casting the melt of the hydrogen-absorbing alloy on the cylindrical mold surface, thereby rapidly cooling the melt of hydrogen-absorbing alloy; and,
adjusting the rotary speed of the rotary body and the feeding amount of melt such that the melt fed to the predetermined bottom portion substantially solidifies during one rotary displacement of the mold.

The centrifugal casting is known for producing a tubular cast product. In the known casting method, the melt is caused to flow on the inner cylindrical surface of a rotary mold in its longitudinal direction. The melt flows until a uniform thickness of the final product is attained, while maintaining the molten state. In addition, the casting is carried out in a short period of time, so as not to form such casting defects as cold shut. Since the casting process is as described above, the grain size of the so-produced material is not refined.

It will be described hereinbelow how the feeding method of melt, casting speed and cooling method of the present invention are devised as compared with the conventional centrifugal casting method.

A preferable hydrogen-absorbing alloy, which can adequately exhibit the advantages of the present invention, is the $AB_5$ type alloy which has good hydrogen-absorbing properties. The component "A" is a rare earth element or a mixture of rare earth elements, such as misch metal. The component "B" is Ni. A part of Ni may be replaced with at least one element selected from the group consisting of Al, Mn, Co, Cu, Fe, Cr, Zr, Ti, Si and B (boron). In these "B" components, Ni or Ni, a part of which is replaced with at least one element selected from the group consisting of Mn, Al and Co, is more preferable.

Other known hydrogen-absorbing alloys, such as Mg-Ni, Ti-Fe, Ti-Mn, TiA(B, C) ("A" is Zr, "B" is Co and/or Ni, and "C" is V, Fe, Mn, Cu, Mo and/or Nb) can also be centrifugally cast by the inventive method so as to refine the crystals and lessen the segregation.

The alloy materials are melted in a vacuum induction furnace and is then fed into a rotary body which is positioned essentially horizontally and is rotated around the longitudinal axis. A protective atmosphere, such as vacuum or inert gas is used for the melted and cast alloy materials. The inner surface of the rotary body defines the mold surface.

During rotation of a mold, the melt is continuously fed downward to a predetermined position(s). This position(s) is displaced along a circle together with the rotation of a mold and again arrives at the location directly beneath the melt-feeding nozzle(s). The feeding of melt on the predetermined position(s) is therefore repeated. It is important that the melt fed to the predetermined position is completely solidified until next rotation of a mold. While such feeding is repeated, thickness of the cast ingot increases. It is also important that melt feeding amount on the mold surface or the growth speed of the ingot is so controlled that the melt is rapidly cooled.

Average increasing speed of the thickness of the cast ingot must be approximately 0.1 cm/second or less, preferably 0.05 cm/second or less, because the melt once fed on a position entirely solidifies during one rotation or before the next feeding of melt on said position. In addition, the temperature fall of the solid metal is so rapid that the solidification and cooling of the next fed melt are promoted. An ingot so cast and cooled has fine structure and small segregation. This average speed of solidification and cooling is equal to the average depositing speed of the melt. The average depositing speed of melt is expressed by V/S (cm/second), with the proviso that the inner surface of a mold is S ($cm^2$) and the feeding amount of melt per second is V ($cm^3$).

The rapid cooling, which is a feature of the present invention, can also be attained by controlling the solidfication process as follows. The once-fed melt solidifies during one rotation of the rotary body. In the subsequent feeding after one rotation of the rotary body, the melt can thus be fed onto the solidified metal. During the subsequent rotations followed by feeding, the above described process is preferably repeated. No matter how repeatedly the melt is poured on the solid metal, the boundary between the previously and subsequently solidified metal layers is free of defects, probably because virtually integrally fused bonding takes place between these layers.

It is also important that the melt flows smoothly in the runner, sprue, nozzle or feeding aperture, thereby preventing clogging there. The feeding speed of melt should, therefore, be greater than a certain level at which clogging occurs. Such greater feeding speed tends, however, to be contrary to attaining low average increasing speed of the ingot's thickness. Such contrary problem can however be advantageously solved in a large-scale plant, where the feeding amount of melt and the total surface area of a mold are large. In such a plant, the clogging of sprue or the like can be prevented by increasing the feeding amount of melt, while the average increasing speed of the ingot's thickness can be kept at a low level due to the large surface area of the mold.

If, however, the average increasing speed of the ingot's thickness is very low, a nozzle may become clogged. In addition, since the temperature of previously fed melt falls excessively on the mold surface, the previously and subsequently fed metals do not melt at their boundary with one another but form a clearance. Such clearance then impedes the heat conduction between these layers, with the result that the solidification speed of melt poured on these layers is lowered. The average increasing speed of the ingot's thickness is preferably 0.005 cm/second or more in order to avoid the problems as described above.

The melting plant used for melting the alloy materials is not at all limited. An ordinarily used vacuum induction furnace can be used for melting in vacuum or inert-gas atmosphere. The centrifugal casting plant fundamentally consists of a rotary driving mechanism and a cylindrical rotary mold, as in the conventional plant used for casting tubes. The conventional centrifugal casting plant is modified in the present invention, because the main purpose of the inventive centrifugal casting is not to produce a tubular casting product but to refine the structure of an alloy ingot and rapidly cool the alloy melt. The casting plant is modified so as to easily attain the average increasing speed of an ingot's thickness, easily separate the ingot from the mold, easily set and maintain the mold, and furthermore the parts of a casting plant are easily assembled. Preferably, a mold has an inner diameter of 200 mm or more and a length five times, or less than five times of the inner diameter. The inner diameter of the mold should be decided from the points of view described above.

The lowest rotary speed of the mold is 1 G to prevent the melt rotated to the highest position from flowing down under gravity. Higher rotary speed of the mold enables the cast melt to spread over the mold surface under centrifugal force and enhances the cooling effect and homogeneity of the cast metal. In order to further enhance such effects, the rotary speed is preferably 3 G or higher, more preferably 5 G or higher in terms of the centrifugal force exerted on the cast metal. It is advisable to maintain the highest rotary speed of the mold to a level of 100 G in terms of the centrifugal force exerted on the cast metal, because cost problems are incurred in a casting plant, which can withstand higher rotary speed.

Preferably, the melt is fed onto the mold inner surface from two or more locations. In addition, the feeding means of a melt is preferably reciprocated during casting in the longitudinal direction of the mold. These methods enable the melt to be fed more thinly and uniformly on the mold inner surface, and hence promotes development of the solidification layers.

If the feeding means of melt is provided with a single nozzle, such means is reciprocated preferably essentially over the entire length of a mold. If the feeding means is provided with a plurality of nozzles, it may be reciprocated at a shorter distance than in the case of the single nozzle. With the increase in the number of nozzles, the amount of melt passing through each nozzle should be decreased. Thus, the diameter of a plurality of nozzles should be smaller than that of the single nozzle.

A slit may be used in place of a nozzle(s). In this embodiment, the feeding means of melt may comprise: a guiding body of melt to a predetermined feeding position of the melt; and, a slit formed through the guiding body at the feeding position and extending preferably in the longitudinal direction of a mold. Flowing down of melt through one long slit is similar to that through a large number of nozzles having a small diameter, arranged in the longitudinal direction of a mold. When the slit is sufficiently long, the feeding means, such as a tundish may not be reciprocated. However, the feeding means is preferably reciprocated to uniformly feed the melt onto the mold surface.

The cylindrical body may be provided with a gas-cooling means in the inner space thereof, for blowing the gas toward the mold inner surface during casting and hence enhancing the cooling effect and promoting the solidification. Since the centrifugal casting plant includes a sufficient space within the mold, the gas-cooling means, such as a gas-blowing pipe, can be easily installed in the inner space of the mold.

A parting agent is used in the conventional centrifugal casting of tubular alloy. The parting agent is preliminarily applied on the mold surface in a sufficient amount to prevent erosion of the mold, to improve the cast skin and to easily withdraw the ingot from the mold. In the conventional casting method of a hydrogen-absorbing alloy containing a rare earth element, the parting agent is also used in most cases to attain one or more of the effects mentioned above. Since the parting agent is applied with the aid of a water-bearing binder, such as water glass or the like, the parting agent should be thoroughly dried before the casting. In addition, the parting agent may be incorporated in the alloy and may exert detrimental influence upon the properties of a battery when the alloy is assembled in the battery. In the method of the present invention, the parting agent may not necessarily be applied, because the heat load applied to the unit surface area of a mold can be kept at a low level by means of setting the average increasing speed of the ingot's thickness. This means that there is almost no danger of mold erosion. The production cost can be reduced and the productivity can be enhanced, because neither application nor drying of the parting agent is necessary.

An alloy ingot in the form of a tube, obtained by the method of present invention can be directly subjected to a reforming process for shaping the ingot into a form capable of using in a nickel hydrogen battery. This shaping is usually carried out by crushing the alloy ingot to powder under approximately 100 mesh. Preferably, the alloy ingot is heat treated before the crushing to further enhance the homogeneity of the cast ingot. A preferable heating temperature is not less than 900° C. and not more than 1150° C. Though the component segregation has been substantially decreased by the inventive casting method, short time annealing is effective for improving cyclic life of the battery. The temperature of annealing is sufficient from 950° C. to 1150° C. On the other hand, if the heat-treating temperature is higher than 1150° C., the structure become so coarse that the grain-refinement effect attained by the inventive casting method is lost. Furthermore, the oxidation becomes liable to occur.

The present invention is hereinafter described by way of the examples with reference to the drawing.

BRIEF DESCRIPTION OF DRAWING

FIG. 1 is a general view of the centrifugal casting plant used in Examples 1 through 6.

EXAMPLES

Examples 1 through 3

The raw materials including the misch metal, were mixed to provide a composition of 17.6 atomic % of lanthanoid, 52.7 atomic % of nickel, 16.5 atomic % of cobalt, 3.3 atomic % of aluminum, and 9.9 atomic % of manganese. The misch metal used as the source of rare earth elements consisted of 23.1 atomic % of lanthanum, 53.4 atomic % of cerium, 5.8 atomic % of praseodymium, and 16.1 atomic % of neodymium. The raw materials were melted in an alumina crucible using a high-frequency induction furnace. The protective argon gas atmosphere was used in the high-frequency induction furnace. The so prepared alloy melt was centrifugally cast in the centrifugal casting plant shown in FIG. 1. The mold has an inner diameter of 500 mm and length of 1000 mm. The average depositing speed of melt was 0.01 cm/second (in Example 1), 0.05 cm/second (in Example 2) and 0.08 cm/second (in Example 3).

Example 4

The misch metal in Examples 1 through 3 was used. The raw materials including the misch metal were mixed to provide a composition of 16.7 atomic % of lanthanoid, 59.1 atomic % of nickel, 12.5 atomic % of cobalt, 5.0 atomic % of aluminum, and 6.7 atomic % of manganese. The centrifugal casting apparatus as in Examples 1 through 3 was used and the casting was carried out at an average melt depositing speed of 0.05 cm/second.

Example 5

The misch metal in Examples 1 through 3 was used. The raw materials, including the misch metal were mixed to provide a composition of 16.7 atomic % of lanthanoid, 66.6 atomic % of nickel, 5.0 atomic % of cobalt, 5.0 atomic % of aluminum, and 6.7 atomic % of manganese. The centrifugal casting apparatus as in Examples 1 through 3 was used and the casting was carried out at an average melt depositing speed of 0.05 cm/second.

Example 6

The misch metal in Examples 1 through 3 was used. The raw materials, including the misch metal were mixed to provide a composition of 16.1 atomic % of lanthanoid, 60.5 atomic % of nickel, 12.1 atomic % of cobalt, 4.8 atomic % of aluminum, and 6.5 atomic % of manganese. The centrifugal casting apparatus as in Examples 1 through 3 was used and the casting was carried out at an average melt depositing speed of 0.05 cm/second.

Comparative Example 1

The alloy melt having the same compositions as in Examples 1 through 6 were centrifugally cast by using the same plant as in Examples 1 through 6. The average melt depositing speed was, however, increased to 0.2 cm/second. The rapid cooling was thus not carried out. The thickness of the obtained ingot was from 1.0 to 1.2 cm.

The common casting process in Examples 1 through 6 is described with reference to FIG. 1. A tiltable melting furnace 2, a stationary tundish 3a, a reciprocating secondary tundish 3b and a rotary cylindrical mold 4a are located in the vacuum chamber 1. The rotary cylindrical mold 4a is rotated by means of the rotary driving mechanism 6 so as to provide the circumferential speed of the mold's surface amounting to 7 m/second (20 G). The melt is caused to flow from the tiltable melting furnace 2 via the stationary tundish 3a onto the reciprocating secondary tundish 3b and is then poured into the rotary cylindrical mold 4a through nozzles 3c. The melt is thus cast onto the inner surface of the rotary cylindrical mold 4a. The reciprocating secondary tundish 3b is provided with ten nozzles with diameter of 1 cm, 8 cm spaced. The reciprocating secondary tundish 3b is reciprocated during casting in the longitudinal direction thereof. The vacuum chamber 1 was filled with argon gas during casting. The ingot formed had a thin tubular shape and thickness of from 0.5 to 0.6 cm.

Comparative Example 2

The alloy melt having the same compositions as in Examples 1 through 6 was cast into a water-cooled mold made of copper, in the form of an open-top box. The alloy melt was deposited on the mold bottom to a thickness of 3 cm.

The results of casting are as follows.

The cross-sections of the ingots made of four alloy compositions were observed by EPMA to investigate the segregation of manganese. The Mn segregation relative to the average Mn concentration was within: ±19% in Example 1; ±23% in Example 2; ±31% in Example 3; ±17% in Example 4; ±20% in Example 5; ±19% in Example 6; ±65% in Comparative Example 1 and ±88% in Comparative Example 2

The cross-sections mentioned above were also observed by an optical microscope at a magnification of 500 times to investigate the cast structure.

In Examples 1 through 6, the same number of layers as the total number of rotations of a mold was recognized. That is, each layer was distinguished from its adjacent layers. The entire melting together of an upper layer and a lower layer was not detected. This indicates that each layer has been solidified during one rotation of a mold.

In Comparative Example 1, five rotations of a mold should have formed five layers if the inventive casting process had been carried out. However, the layers were not as clearly distinct as in Examples 1 through 6.

Now, a process for producing a nickel hydrogen battery is described.

The alloy ingots were crushed to obtain powder with average grain size of less than 75 μm. To 94.5% by weight of this powder was added PTFE (polytetrafluoroethylene) powder in 5.0% by weight and carbon powder in 0.5% by weight. This powder in total weight of 10 g was mixed and then filled in the pores of a foaming nickel substrate which was then press-formed to provide a cathode. The anode used comprised commercially available nickel hydroxide which is filled in the sintered nickel electrode. The electrolyte used was 6N KOH aqueous solution. The open-type nickel hydrogen electrode was manufactured using the elements mentioned above.

The cyclic charging and discharging test was carried out by the following method. The charging was carried out under the condition of 25° C., 100 mA/g and three hours. The discharging was carried out at a discharging current of 100 mA/g until the inter-terminal voltage fell to 0.75V. The charging and discharging were repeated. The cyclic life was judged to have expired when the discharging capacity was reached to 80% of the initial capacity. The results of the cyclic charging and discharging test are shown in Table 1.

TABLE 1

|  | Average Depositing Speed of Melt (cm/second) | Segregation Range of Mn (%) | Cyclic Life (times) |
| --- | --- | --- | --- |
| Example 1 | 0.01 | ±19% | 603 |
| Example 2 | 0.05 | ±23% | 560 |
| Example 3 | 0.08 | ±31% | 527 |
| Example 4 | 0.05 | ±17% | 596 |
| Example 5 | 0.05 | ±20% | 471 |
| Example 6 | 0.05 | ±19% | 530 |
| Comparative Example 1 | 0.2 | ±65% | 438 |
| Comparative Example 2 | Casting in box mold | ±88% | 301 |

As is shown in Table 1, the cyclic life of the inventive examples is superior to that of the comparative examples.

Examples 7 and 8

The alloy ingots of Examples 2 and 5 were heat treated at 900° C. for 8 hours and 1050° C. for 2 hours in Examples 7 and 8, respectively. The cross section of the so heat-treated ingots were observed by EPMA to investigate the segregation degree of Mn. The Mn segregation relative to the average value was within ±8% in Example 7 and ±19% in Example 8.

The alloy ingots were crushed into powder, which was used as the cathode material of the battery as in Examples 1 through 6. The cyclic life of the batteries was tested as in these examples. The results are shown in Table 2.

TABLE 2

|  | Heat Treating Condition | Segregation Range of Mn (%) | Cyclic Life (times) |
|---|---|---|---|
| Example 7 | 900° C. × 8 hours | ±8% | 668 |
| Example 8 | 1050° C. × 2 hours | ±19% | 575 |

As is clear from Table 2, the cyclic life of Examples 7 and 8 is superior to that of Examples 1 through 6.

As is described hereinabove, the rapid cooling attained by the centrifugal casting decreases the segregation in the ingot of a hydrogen-absorbing alloy. This leads to decrease in segregation in the powder particles of a hydrogen-absorbing alloy. Stress induced in the ingot is less than in an ingot produced by strip casting. Heat treatment of an ingot is not necessary, but, if undertaken, may be carried out in limited time.

The melt is successively poured on the mold inner surface, and, therefore, the melt, which is brought into direct contact with the mold inner surface, is the first poured one. The erosion of the mold is, therefore, very slight. The centrifugal casting plant can be easily large-scaled. Cost reduction can, therefore, be attained by the present invention.

We claim:

1. A method for producing a hydrogen-absorbing alloy, comprising the steps:

preparing a rotary body having a cylindrical inner surface;

rotating the rotary body around its longitudinal axis;

preparing melt of the hydrogen-absorbing alloy; and, pouring, on the cylindrical mold surface formed by the cylindrical inner surface, the melt of the hydrogen-absorbing alloy at an average depositing speed of approximately 0.1 cm/second or less, thereby centrifugally casting and rapidly cooling the melt of the hydrogen-absorbing alloy on the cylindrical mold surface.

2. A method for producing a hydrogen-absorbing alloy according to claim 1, wherein the average depositing speed of melt is from approximately 0.005 to 0.1 cm/second.

3. A method for producing a hydrogen-absorbing alloy according to claim 1, wherein the melt-pouring step is carried out by feeding the melt through one or more nozzles.

4. A method for producing a hydrogen-absorbing alloy according to claim 3, wherein two or more nozzles are arranged in a direction along the longitudinal direction of the rotary body.

5. A method for producing a hydrogen-absorbing alloy according to claim 3 or 4, further comprising the steps:

guiding the melt into an inner space of the rotary body by a runner means; and, reciprocating the runner means in a longitudinal direction of the rotary body.

6. A method for producing a hydrogen-absorbing alloy claim 1, 2 or 3, wherein said hydrogen-absorbing alloy contains one or more rare earth elements.

7. A method for producing a hydrogen-absorbing alloy according to claim 6, wherein said hydrogen-absorbing alloy is $AB_5$ type, in which the component "A" is a rare earth element or a mixture of the rare earth elements, and, further the component "B" is Ni.

8. A method for producing a hydrogen-absorbing alloy according to claim 1 or 2, wherein the melt-pouring step is carried out by feeding the melt through one or more slits.

9. A method for producing a hydrogen-absorbing alloy according to claim 8, wherein said slit is a single slit elongated in the longitudinal direction of the rotary body.

10. A method for producing a hydrogen-absorbing alloy claim 1, 2, or 3, further comprising the steps of:

annealing the centrifugally cast alloy at a temperature of from 900° to 1150° C.

11. A method for producing a hydrogen-absorbing alloy according to claim 7, wherein the component "B" is Ni and at least one additional element selected from the group consisting of Al, Mn, Co, Cu, Fe, Cr, Zr, Ti, Si, and B (boron).

12. A method for producing a hydrogen-absorbing alloy, comprising the steps:

preparing a rotary body having a cylindrical inner surface which forms the cylindrical mold surface;

rotating the rotary body around its longitudinal axis;

preparing melt of the hydrogen-absorbing alloy;

pouring the melt of the hydrogen-absorbing alloy on the mold surface to a predetermined bottom portion, thereby centrifugally casting and rapidly cooling the melt of the hydrogen-absorbing alloy on the cylindrical inner mold surface; and, adjusting the rotary speed of the rotary body and the pouring amount of melt such that the melt poured to the predetermined bottom portion solidifies during one rotation of the rotary body.

13. A method according to claim 12, further comprising a step of pouring the melt of hydrogen-absorbing alloy onto the completely solidified hydrogen-absorbing alloy at said predetermined bottom portion.

14. A method for producing a hydrogen-absorbing alloy according to claim 12 or 13, further comprising a step of:

annealing the centrifugally cast alloy at a temperature of from 900° to 1150° C.

* * * * *